(12) United States Patent
Rajadurai et al.

(10) Patent No.: US 9,729,314 B2
(45) Date of Patent: Aug. 8, 2017

(54) METHOD AND SYSTEM OF SECURING GROUP COMMUNICATION IN A MACHINE-TO-MACHINE COMMUNICATION ENVIRONMENT

(75) Inventors: Rajavelsamy Rajadurai, Byrasandra (IN); Han-Na Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 13/701,696

(22) PCT Filed: Jun. 1, 2011

(86) PCT No.: PCT/KR2011/004021
§ 371 (c)(1),
(2), (4) Date: Dec. 3, 2012

(87) PCT Pub. No.: WO2011/152665
PCT Pub. Date: Dec. 8, 2011

(65) Prior Publication Data
US 2013/0080782 A1    Mar. 28, 2013

(30) Foreign Application Priority Data
Jun. 1, 2010    (IN) ............................ 1508/CHE/2010

(51) Int. Cl.
*H04L 9/08*    (2006.01)
*H04L 29/06*    (2006.01)
*H04W 4/00*    (2009.01)
*H04W 12/04*    (2009.01)
*H04W 12/06*    (2009.01)

(52) U.S. Cl.
CPC .............. *H04L 9/08* (2013.01); *H04L 63/065* (2013.01); *H04W 4/005* (2013.01); *H04W 12/04* (2013.01); *H04W 12/06* (2013.01)

(58) Field of Classification Search
CPC ....................................................... H04L 9/08
See application file for complete search history.

(56) References Cited

U.S. PATENT DOCUMENTS 6,049,878 A *  4/2000  Caronni et al. ................... 726/3
2008/0153521 A1  6/2008  Benaouda et al.
(Continued)

OTHER PUBLICATIONS

XP015009520, Hardj0n0 Verisign B Weis Cisc0 T: The Multicast Group Security Architecture; rfc3740.txt, Mar. 1, 2004.
(Continued)

*Primary Examiner* — Saleh Najjar
*Assistant Examiner* — Simon Kanaan
(74) *Attorney, Agent, or Firm* — Jefferson IP Law, LLP

(57) ABSTRACT

A method and system for securing group communication in a Machine-to-Machine (M2M) communication environment including a plurality of Machine Type Communication (MTC) groups, wherein each of the plurality of MTC groups includes a plurality of MTC devices. The method includes generating a unique group key for securing communication with MTC devices associated with an MTC group in an M2M communication environment, securely providing information on the unique group key to the MTC devices associated with the MTC group, and securely communicating at least one broadcast group message with the MTC devices using the unique group key information.

17 Claims, 8 Drawing Sheets

(56) References Cited

U.S. PATENT DOCUMENTS

| | | |
|---|---|---|
| 2009/0217348 A1 | 8/2009 | Salmela et al. |
| 2009/0305671 A1* | 12/2009 | Luft .................. G06Q 30/0205 |
| | | 455/411 |
| 2010/0011063 A1 | 1/2010 | Blaiotta et al. |
| 2010/0057485 A1 | 3/2010 | Luft |
| 2012/0039213 A1* | 2/2012 | Cheng et al. ................ 370/254 |
| 2013/0051228 A1* | 2/2013 | Kim ..................... H04W 4/005 |
| | | 370/230 |

OTHER PUBLICATIONS

XP050630490,Alcatel-Lucent Shanghai Bell et al: "Network improvement for group based mobility", Jan. 12, 2010.
XP050436765, Huawei et al: Requirements of NIMTC security, Apr. 19, 2010.

* cited by examiner

METHOD AND SYSTEM OF SECURING GROUP COMMUNICATION IN A MACHINE-TO-MACHINE COMMUNICATION ENVIRONMENT

PRIORITY

This application is a National Stage application under 35 U.S.C. §371 of an International application filed on Jun. 1, 2011 and assigned application No. PCT/KR2011/004021, and claims the benefit under 35 U.S.C. §365(b) of a Indian patent application filed on Jun. 1, 2010 in the Indian Intellectual Property Office and assigned Serial No. 1508/CHE/2010, the entire disclosure of which is hereby incorporated by reference.

BACKGROUND OF THE INVENTION

1. Field of the Invention

The present invention relates to the field of Machine to Machine (M2M) communication. More particularly, the present invention relates to group communication in a M2M environment.

2. Description of the Related Art

Machine-to-Machine (M2M) communication, which may also be referred to as Machine-Type Communications (MTC), is a form of data communications between devices, such as MTC devices, that may communicate without human interaction or a human generated command. For example, in M2M communication, an MTC device, such as a sensor or meter, may capture event data which is then relayed through an operator network to an application residing in an MTC server for analysis and necessary action. The MTC device and the MTC server may communicate with each other using an operator network based on network technologies such as $3^{rd}$ Generation Partnership Project (3GPP) technologies, Global System for Mobile Communications (GSM), Universal Mobile Telecommunications System (UMTS), Long Term Evolution (LTE), or any other similar and/or suitable communication and/or network technology.

M2M communication may be used in a variety of areas such as smart metering systems which may provide applications related to power, gas, water, heating, grid control, and industrial metering, surveillance systems, order management, gaming machines, health care communication and any other similar and/or suitable area in which M2M communication may be used. Additionally, M2M communication based on MTC technology may be used in areas such as customer service.

Recent advancement in M2M communication has enabled grouping of MTC devices together such that the operator of MTC devices may easily manage MTC devices belonging to the same group. For example, a MTC server may be linked to a plurality of production plants that employ or use MTC devices in order to monitor and maximize production of the plurality of production plants. The MTC devices belonging to the same group may be in a same location, may have the same and/or similar MTC features and may belong to the same MTC user. Such arrangements of MTC devices provides flexibility in allocating a group and hence may provide an easier mode for operations such as controlling, updating, charging, and other similar and/or suitable operations of the MTC devices in a granularity of a group. Thus, redundant signaling may be significantly reduced to avoid congestion when performing M2M communication. In a MTC group, the MTC devices may be securely addressed for control, management, or charging operations. However, according to related art, one or more group messages may be broadcasted to the MTC devices in an insecure manner, which may sometimes lead to spoofing of group messages. Accordingly, there is a need for secure group communication using M2M communication.

SUMMARY OF THE INVENTION

Aspects of the present invention are to address at least the above-mentioned problems and/or disadvantages and to provide at least the advantages described below. Accordingly, an aspect of the present invention is to provide a method and system for securing group communication in a Machine-to-Machine (M2M) communication environment.

In accordance with an aspect of the present invention, a method for securing group communication in an M2M communication environment including a plurality of Machine Type Communication (MTC) groups, wherein each of the plurality of MTC groups includes a plurality of MTC devices is provided. The method includes generating a unique group key for securing communication with MTC devices associated with an MTC group in an M2M communication environment, securely providing information on the unique group key information to the MTC devices associated with the MTC group, and securely communicating at least one broadcast group message with the MTC devices using the unique group key information.

In accordance with another aspect of the present invention, an M2M communication system is provided. The M2M communication system includes a plurality of MTC devices belonging to at least one MTC group, an MTC server communicatively coupled with the plurality of MTC devices, and a network entity for securing group communication between the MTC server and the plurality of MTC devices, wherein network entity includes a group key module for generating a unique group key for securing communication with at least one of the plurality of MTC devices associated with at least one MTC group, securely providing the unique group key information to the at least one of the plurality of MTC devices associated with the at least one MTC group, and securely communicating at least one broadcast group message with the at least one of the plurality of MTC devices using the unique group key information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

The drawings described herein are for illustration purposes only and are not intended to limit the scope of the present disclosure in any way.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

Figure 1:
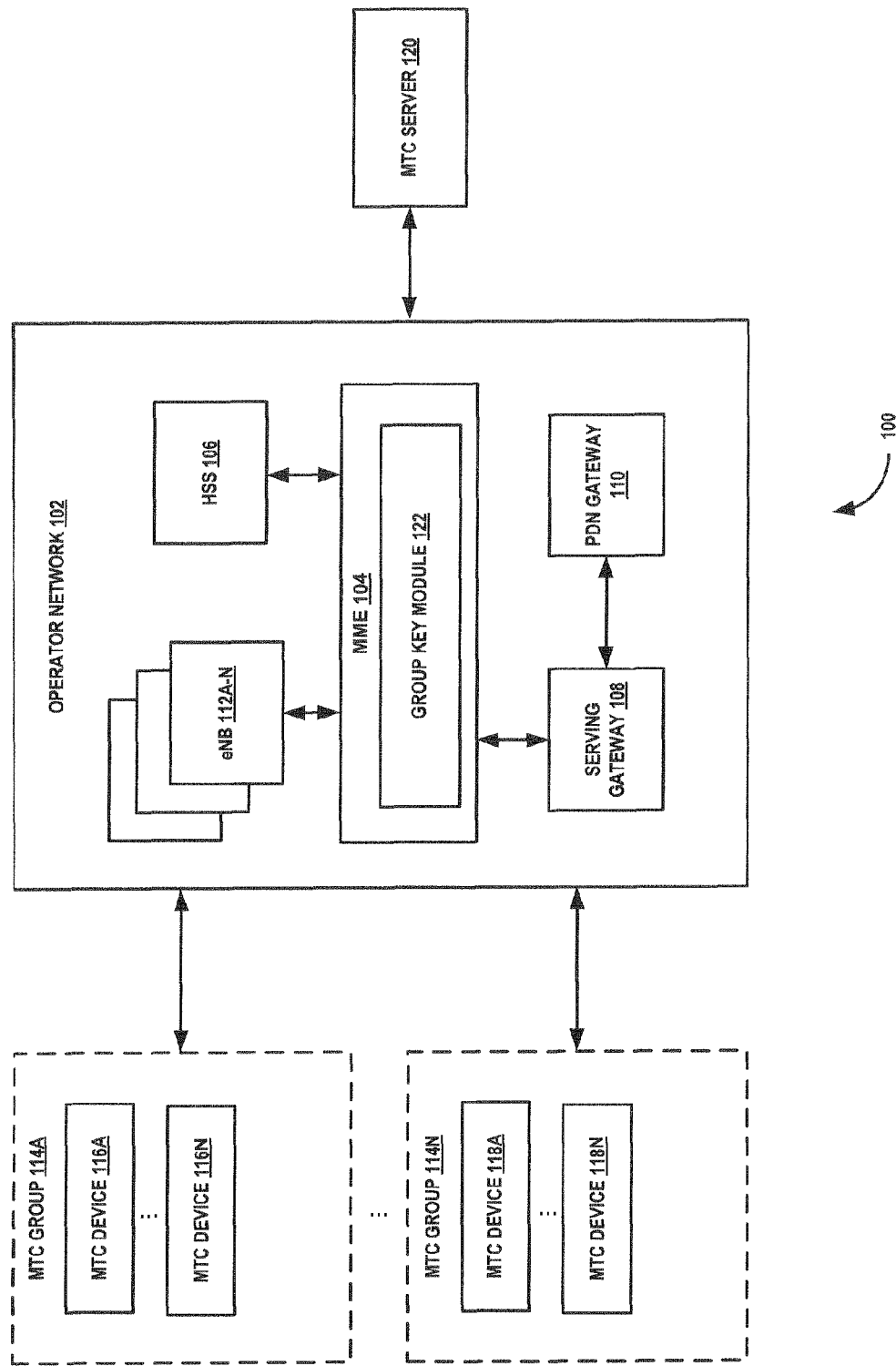
FIG. 1 is a block diagram illustrating a Machine-to-Machine (M2M) communication environment for securing group communication with Machine Type Communication (MTC) devices belonging to an MTC group, according to an exemplary embodiment of the present invention.

FIG. 1 is a block diagram illustrating an M2M communication environment for securing group communication with MTC devices belonging to a MTC group, according to an exemplary embodiment of the present invention.

Referring to FIG. 1, an M2M communication environment 100 includes an operator network 102, MTC groups 114A-N and an MTC server 120. The operator network 102 may be a Long Term Evolution (LTE) network and may include network entities such as a Mobile Management Entity (MME) 104, a Home Subscriber Server (HSS) 106, a serving gateway 108, a Packet Data Network (PDN) gateway 110, one or more evolved Node B (eNB) terminals 112A-N, and/or any other similar and/or suitable network entities. However, the present invention is not limited thereto, and the operator network 102 may be a Global System for Mobile Communications (GSM) network, a Universal Mobile Telecommunications System (UMTS) network, a Worldwide Interoperability for Microwave Access (WiMAX) network, and any other similar and/or suitable network type.

The MTC groups 114A-N may be formed by grouping a plurality of MTC devices associated with the operator network 102. For example, the operator network 102 may form the MTC group 114A including MTC devices 116A-N and a MTC group 114N including MTC devices 118A-N according to a user, a location and features associated with the MTC devices 116A-N and 118A-N.

According to an exemplary embodiment, the MTC server 120 may communicate with the MTC devices 116A-N and 118A-N according to MTC groups to which the MTC server 120 belongs. Also, one or more of the MTC devices 116A-N and 118A-N may belong to more than one of the MTC groups 114A-N. According to an exemplary embodiment, the operator network 102 may enable the MTC server 120, or any other network entity, to securely communicate with any MTC device belonging to the MTC groups 114A-N.

According to an exemplary embodiment, there may be a case where the MTC server 120 has to send a group message to the MTC devices 116A-N belonging to the MTC group 114A via the operator network 102. In order to securely communicate the group message, a group key module 122 that is included in the MME 104 identifies an MTC group associated with the MTC devices 116A-N. The group key module 122 may identify the MTC group 114A by obtaining the information associated with the MTC group 114A from the HSS 106 or from a source MME or Serving General Packet Radio Service (GPRS) Support Node (SGSN). In a case where the MTC group 114A is formed by the HSS 106, then the information associated with the MTC group 114A may be obtained from the HSS 106. Accordingly, the group key module 122 may generate a unique group key based on the information, such as a group identifier, associated with the MTC group 114A. According to an exemplary embodiment, the unique group key identifier may be provided with a validity period. The validity period may indicate a duration of time for which the unique group key is valid.

The group key module 122 may securely distribute the unique group key information to the MTC devices 116A-N associated with the MTC group 114A via an associated eNB, such as the eNB 112A. The unique group key information may include a unique group key, an index value associated with the unique group key, a validity period associated with the unique group key, a selected security algorithm for group message protection, and any other similar and/or suitable information. The unique group key information may be securely distributed to the MTC devices 116A-N using a Non Access Stratum (NAS) Security Mode Command (SMC) procedure, a new MTC group SMC procedure, and a Protocol Configuration Options (PCO), as will be illustrated in FIGS. 3 through 5, or may use any other similar and/or suitable distribution procedure. Upon secured distribution, the group key module 122 may also communicate the unique group key information associated with the MTC group 114A to the associated eNB 112A, whereby the eNB 112A may store the unique group key information in its memory for further use.

Accordingly, when at least one group message is received from the MTC server 120, the eNB 114 may encrypt the at least one group message using the unique group key information and may broadcast the encrypted at least one group message to the MTC devices 116A-N. Thus, the at least one group message may be protected from spoofing. When each of the MTC devices 116A-N receives the encrypted at least one group message, each of the MTC devices 116A-N may decrypt the encrypted at least one group message using the unique group key information received from the operator network 102 for further processing. In this manner, data communication of group messages may be performed in a secured manner using the unique group key information. Furthermore, if the unique group key includes a validity period, then the group key module 122 may generate a new group key and an index associated with the new group key and may distribute the same prior to expiry of the validity period according to the procedure described above.

Figure 2:
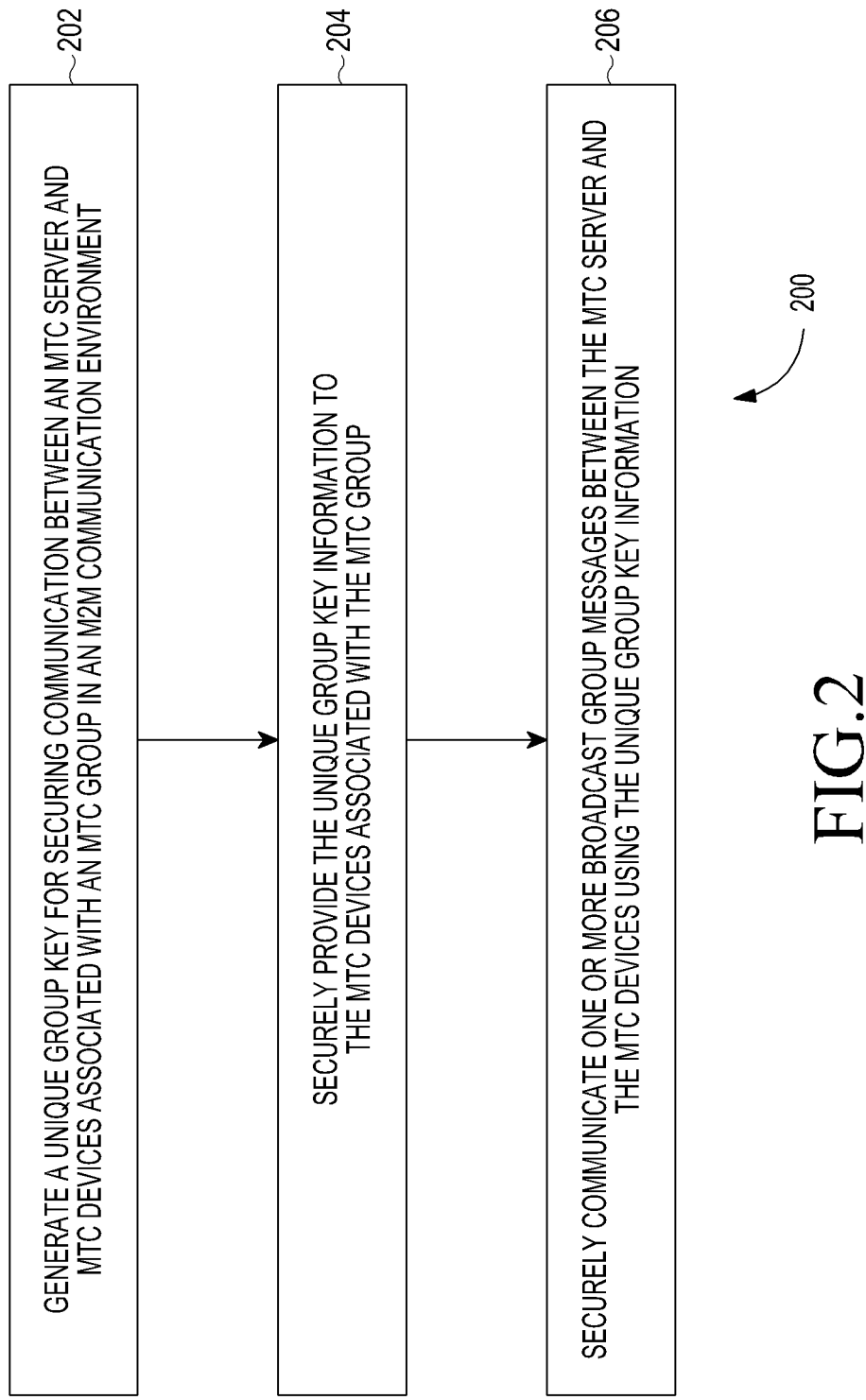
FIG. 2 is a process flowchart illustrating an exemplary method of securing group communication between an MTC server and the MTC devices belonging to the MTC group, according to an exemplary embodiment of the present invention.

FIG. 2 is a process flowchart illustrating an exemplary method of securing group communication between an MTC server and the MTC devices belonging to the MTC group, according to an exemplary embodiment of the present invention.

Referring to FIG. 2, an exemplary method 200 of securing group communication between the MTC server 120 and the MTC devices 116A-N belonging to the MTC group 114A, is shown. At operation 202, a unique group key is generated for securing communication between the MTC server 120 and the MTC devices 116A-N associated with the MTC group 114A in the M2M communication environment. According to an exemplary embodiment, the unique group key may be generated according to a receipt of a NAS attach request message from one of the MTC devices 116A-N, such as a first member of the MTC group 114A, and may be used for performing a network access authentication procedure.

Next, at operation 204, the unique group key information may be securely provided to the MTC devices 116A-N associated with the MTC group 114A. According to an exemplary embodiment, the unique group key information may be encrypted using a NAS security context established between one of the MTC device 116A-N and the MME 104. At operation 206, one or more broadcast group messages may be securely communicated between the MTC server 120 and the MTC devices 116A-N using the unique group key information.

Figure 3A:
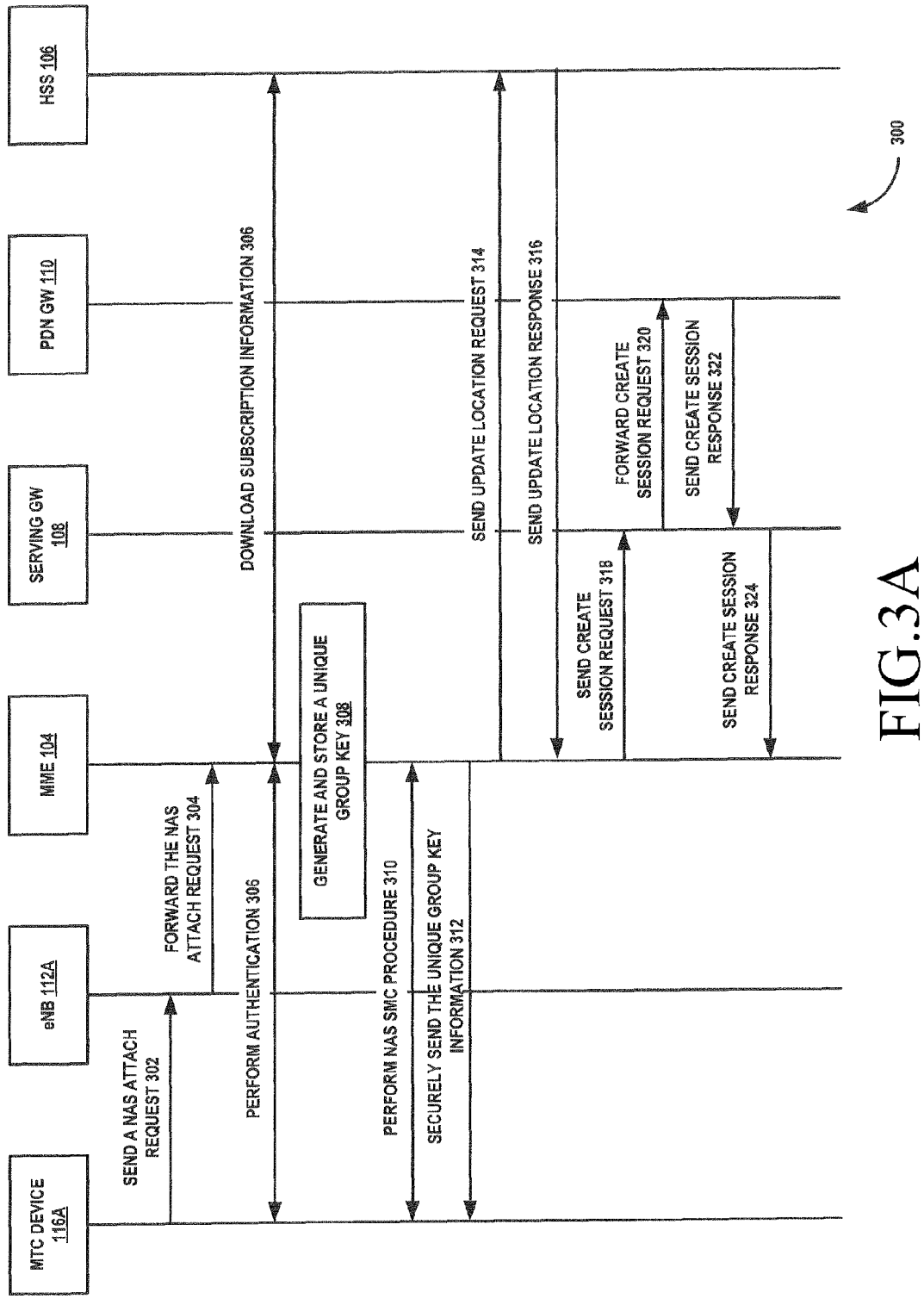
FIGS. 3A and 3B are a flow diagram illustrating distribution of a unique group key to MTC devices in an MTC group using a Non-Access Stratum (NAS) Security Mode Command (SMC) procedure in a Long Term Evolution (LTE) network, according to an exemplary embodiment of the present invention.
Figure 3B:
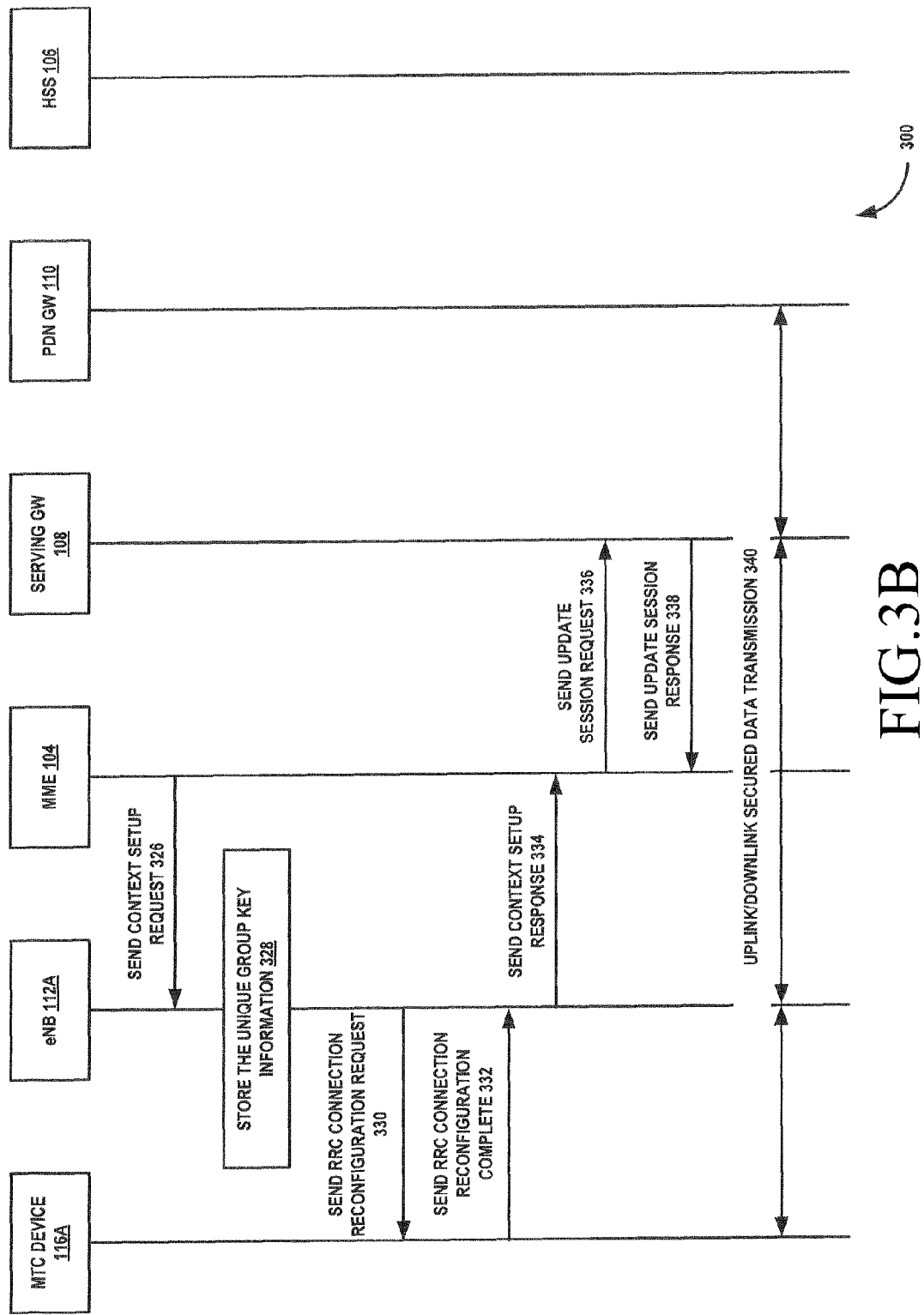

FIGS. 3A and 3B are a flow diagram illustrating distribution of a unique group key to MTC devices in an MTC group using a NAS SMC procedure in an LTE network, according to an exemplary embodiment of the present invention.

Referring to FIGS. 3A and 3B, a flow diagram 300 illustrates distributing a unique group key to MTC devices in a MTC group using a NAS SMC procedure in an LTE network, according to an exemplary embodiment. At operation 302, the MTC device 116A sends a NAS attach request message to an eNB 112A. For example, the NAS attach request message may be sent at the end of a Radio Resource Control (RRC) connection setting procedure. At operation 304, the eNB 112A forwards the NAS attach request message to the MME 104. Next, at operation 306, the MME 104 performs a network access authentication procedure with the MTC device 116A, and during the authentication procedure, the MME 104 downloads subscription information from the HSS 106. The subscription information may include a group identifier associated with a MTC group to which the MTC belongs to, or may include any other similar and/or suitable information.

At operation 308, the MME 104 generates a unique gGroup key (Gkey) for each group and assigns a Gkey index (Gki) to the unique Gkey if the key is not generated previously for the MTC group. Alternatively, if the unique Gkey is already generated, the MME 104 retrieves the previously stored unique Gkey for the MTC device 116A. Also, at operation 308, the MME 104 stores the group information for NAS level protection of group messages for the MTC group 114A. According to an exemplary embodiment, the MME 104 may derive cryptographic keys from the unique Gkey for userplane, NAS and AS message protection. According to another exemplary embodiment, the MME 104 may dynamically form a new group based on the subscriber information and MTC feature subscribed. For example, the MME may create the MTC group for MTC devices accessing the MTC server 120 from a particular location.

At operation 310, the MME 104 performs a NAS SMC procedure with the MTC device 116A in order to activate integrity protection and NAS ciphering. At operation 312, the MME 104 securely sends the unique Gkey information, which may include the group identifier, the Gkey, and the Gki, in a group SMC message to the MTC device 116A.

Furthermore, the group SMC message including the unique Gkey information may also be sent during the NAS SMC procedure. According to an exemplary embodiment, the unique Gkey information is protected by a NAS security context established between the MTC device 116A and the MME 104. In the above discussed exemplary embodiments, the unique Gkey information is encrypted by the NAS security context such that only the MTC device 116A may decrypt it. According to an exemplary embodiment, the group SMC message may also include selected security algorithms, such as integrity protection and encryption algorithms, for group message protection. Furthermore, the MME 104 may also be capable of initiating a group SMC procedure at any point of time in order to refresh or to assign a new Gkey and related information. The decision to refresh the unique Gkey according to a validity period, a number of messages protected, a number of MTC devices attached or detached, or a wrap-around of a count value. Moreover, the unique Gkey may be refreshed according to a configuration option and an operator policy. However, the present invention is not limited thereto, and the Gkey may be refreshed according to any similar and/or suitable reason and/or condition.

At operation 314, the MME 104 sends an update location request to the HSS 106. At operation 316, the HSS 106 sends an update location acknowledgment including subscription information associated with the MTC device 116A to the MME 104. At operation 318, the MME 104 sends a create session request to the serving gateway 108 for creating a default bearer. The create session request may include an International Mobile Subscriber Identity (IMSI), an Enhanced-Radio Access Bearer (E-RAB) setup list, which may also be referred to as an E-RAB IDentity (ID), a Group ID, and any other similar and/or suitable information. At operation 320, the serving gateway 108 forwards the create session request to the PDN gateway 110. The create session request may include an IMSI, an E-RAB ID, a Group ID, S5 downlink information and so on. The S5 downlink information may include an Internet Protocol (IP) address of the serving gateway 108 and a General Packet Radio Service (GPRS) Tunneling Protocol-User plane (GTP-U) Tunnel Endpoint IDentifier (TEID).

Accordingly, at operation 322, the PDN gateway 110 sends a create session response including the E-RAB ID, the common S5 uplink information, and other similar information, to the serving gateway 108 in response to the create session request. The serving gateway 108 then forwards the create session response, including the E-RAB ID, the common S1 uplink information, and the other similar information to the MME 104, at operation 324. As shown in FIG. 3B, at operation 326, the MME 104 sends a context setup message including the NAS attach accept, the E-RAB setup list, the unique Gkey information, the S1 uplink information, and the other similar information to the eNB 112A. Next, at operation 328, the eNB 112A stores the unique Gkey information for group message protection.

At operation 330, the eNB 112A performs a Radio Resource Control (RRC) connection reconfiguration procedure with the MTC device 116A by sending an RRC connection reconfiguration request to the MTC device 116A. At operation 332, the MTC device 116A sends an RRC connection reconfiguration complete message to the eNB 112A. Upon completion, the eNB 112A sends a context setup response including the E-RAB setup list, the E-RAB ID, the S1 downlink information, and the other similar information to the MME 104, at operation 334. For example, the S1 downlink information may include an IP address of the eNB 112A and the GTP-U TEID.

At operation 336, the MME 104 sends an update session request including the IMSI, the E-RAB ID, the S1 downlink information, and the other similar information to the serving gateway 108. Accordingly, at operation 338, the serving gateway 108 sends an update session response to the MME 104 in response to the update session request. At operation 340, uplink and downlink data transmission between the MTC server 120 and the MTC device 116A is performed in a secured manner using the unique Gkey information. Furthermore, the MTC device 116A may delete the unique Gkey information when the MTC device detaches or disconnects from the operator network 102.

Figure 4A:
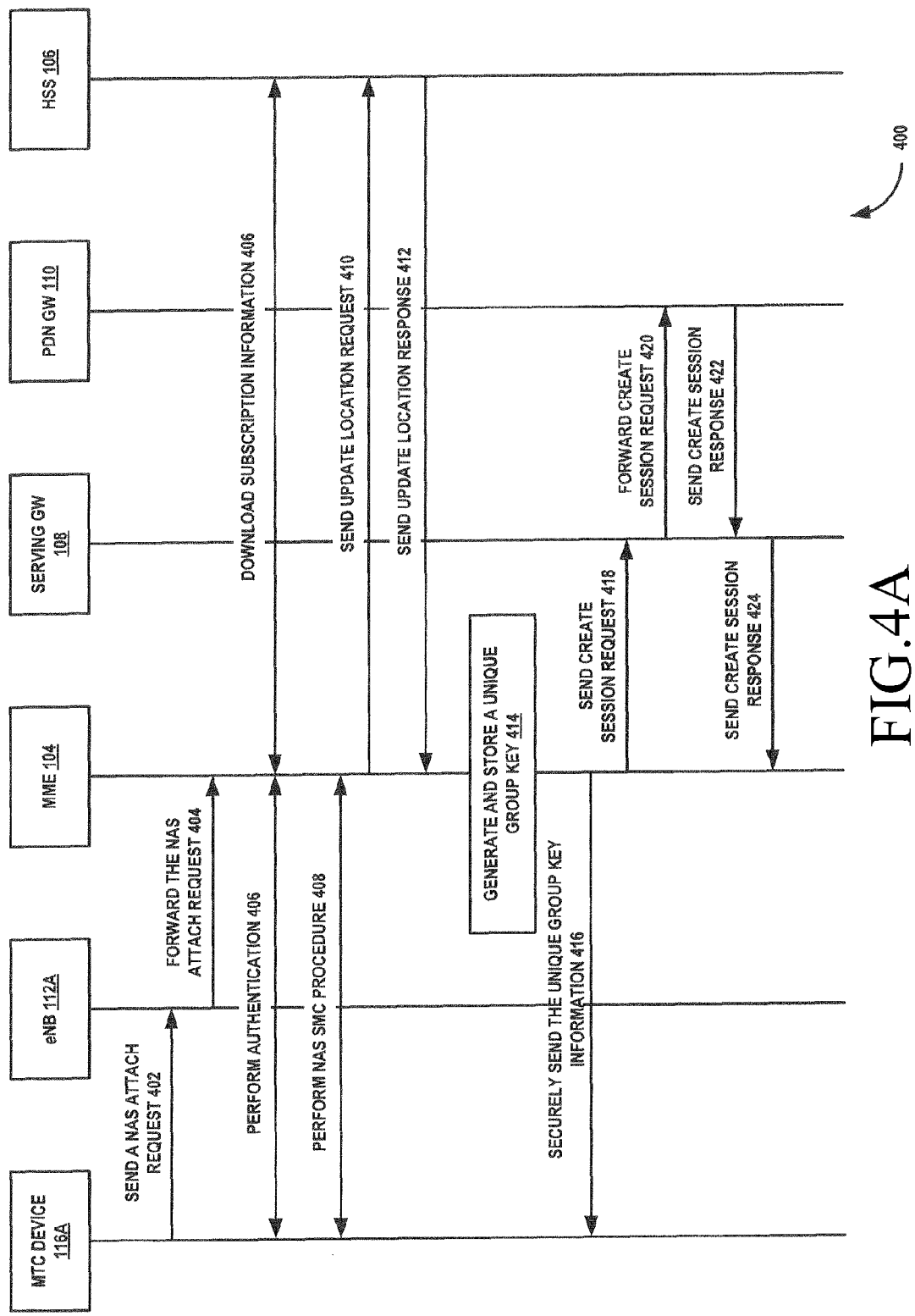
FIGS. 4A and 4B are a flow diagram illustrating distribution of a unique group key to MTC devices in an MTC group using a NAS SMC procedure, according to an exemplary embodiment of the present invention.
Figure 4B:
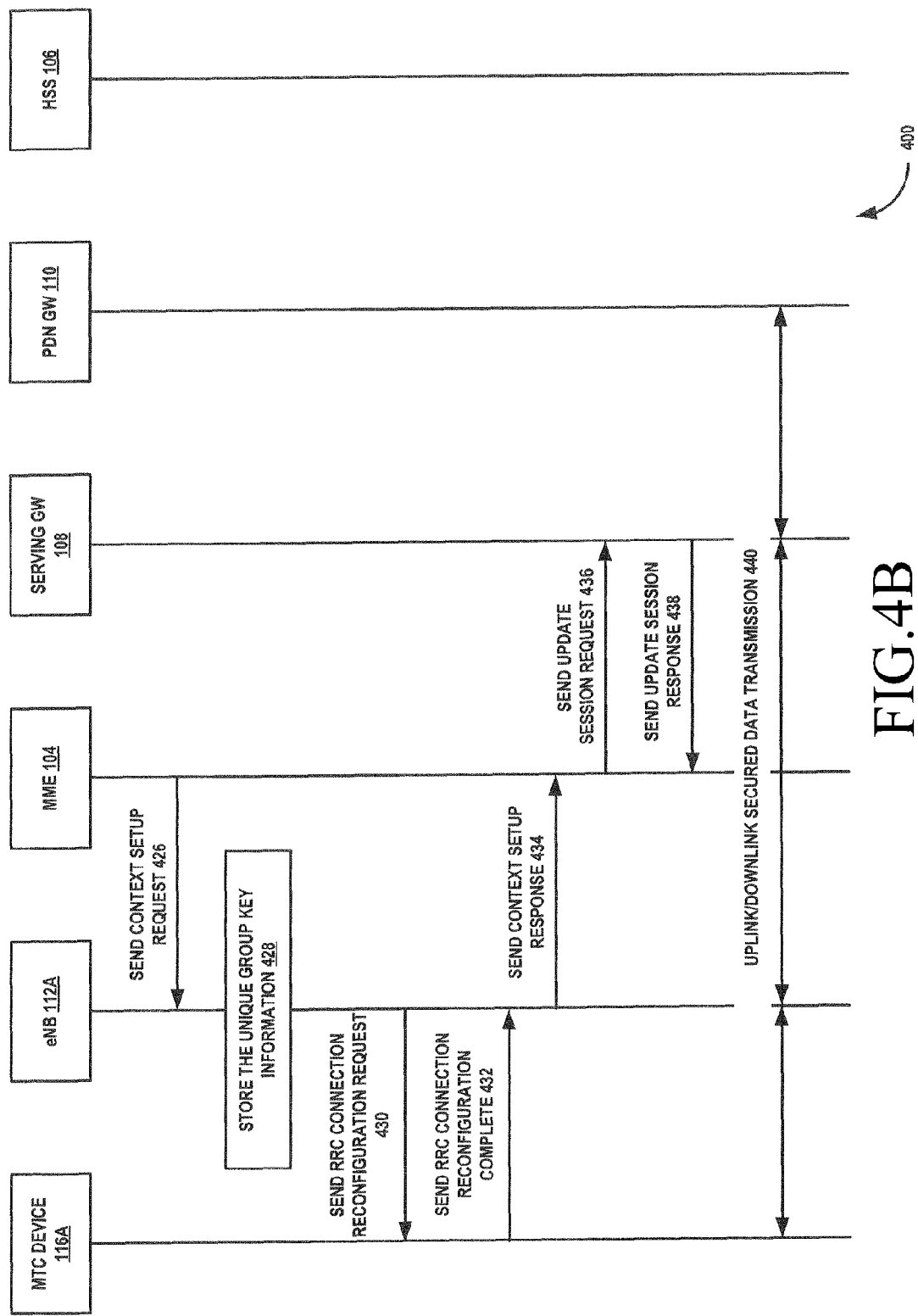

FIGS. 4A and 4B are a flow diagram illustrating distribution of a unique Gkey to MTC devices in an MTC group using a NAS SMC procedure, according to an exemplary embodiment of the present invention.

Referring to FIGS. 4A and 4B, a procedure 400 for distributing the unique Gkey is illustrated, and, at operation 402, an MTC device 116A sends a NAS attach request message to an eNB 112A. The NAS attach request message may be sent at the end of an RRC connection setting procedure. At operation 404, the eNB 112A forwards the NAS attach request message to the MME 104. At operation 406, the MME 104 performs a network access authentication procedure with the MTC device 116A. During the authentication procedure of operation 406, the MME 104 downloads subscription information from the HSS 106. The subscription information may include a group identifier indicating a MTC group to which the MTC belongs to.

At operation 408, the MME 104 performs a NAS SMC procedure with the MTC device 116A in order to activate integrity protection and NAS ciphering. At operation 410, the MME 104 sends an update location request to the HSS 106. At operation 412, the HSS 106 sends an update location acknowledgment including subscription information associated with the MTC device 116A to the MME 104.

At operation 414, the MME 104 generates a unique Gkey per group and assigns a Gki if a Gki was not generated previously for the MTC group 114A. Also, at operation 414, the MME 104 stores the group information for NAS level protection of group messages for the MTC group 114A. At operation 416, the MME 104 securely communicates the unique Gkey information, such as the group identifier, the Gkey, and the Gki, in a group SMC message to the MTC device 116A. According to an exemplary embodiment, the unique Gkey information may be protected using a NAS security context established between the MTC device 116A and the MME 104. At operation 418, the MME 104 sends a create session request to the serving gateway 108 for creating a default bearer. The create session request may include the IMSI, the E-RAB setup list which may also be referred to as the E-RAB ID, and the Group ID. At operation 420, the serving gateway 108 forwards the create session request to the PDN gateway 110. The forwarded create session request may include the IMSI, the E-RAB ID, the Group ID, the S5 downlink information and other similar information. The S5 downlink information may include an IP address of the serving gateway 108 and the GTP-U TEID.

Accordingly, at operation 422, the PDN gateway 110 sends a create session response, which may include the E-RAB ID, common S5 uplink information, and the other similar information, to the serving gateway 108 in response to the create session request. The serving gateway 108 then forwards the create session response including the E-RAB ID, the common S1 uplink information, and the other similar information to the MME 104, at operation 424. As shown in FIG. 4B, at operation 426, the MME 104 sends a context setup request message including the NAS attach accept, the E-RAB setup list, the unique Gkey information, the S1 uplink information, and the other similar information to the eNB 112A. At operation 428, the eNB 112A stores the unique Gkey information for group message protection.

At operation 430, the eNB 112A performs an RRC connection reconfiguration procedure with the MTC device 116A by sending an RRC connection reconfiguration request to the MTC device 116A. At operation 432, the MTC device 116A sends an RRC connection reconfiguration complete message to the eNB 112A. Upon completion of the RRC connection reconfiguration procedure, the eNB 112A sends a context setup response including the E-RAB setup list, which may include the E-RAB ID, the S1 downlink information and other similar information to the MME 104, at operation 434. The S1 downlink information may include the IP address of the eNB 112A and the GTP-U TEID.

At operation 436, the MME 104 sends an update session request, including the IMSI, the E-RAB ID, the S1 downlink information, and the other similar information, to the serving gateway 108. Accordingly, at operation 438, the serving gateway 108 sends an update session response to the MME 104 in response to the update session request of operation 436. At operation 440, communication of group messages between the MTC server 120 and the MTC device 116A is performed in a secured manner using the unique Gkey information.

Figure 5A:
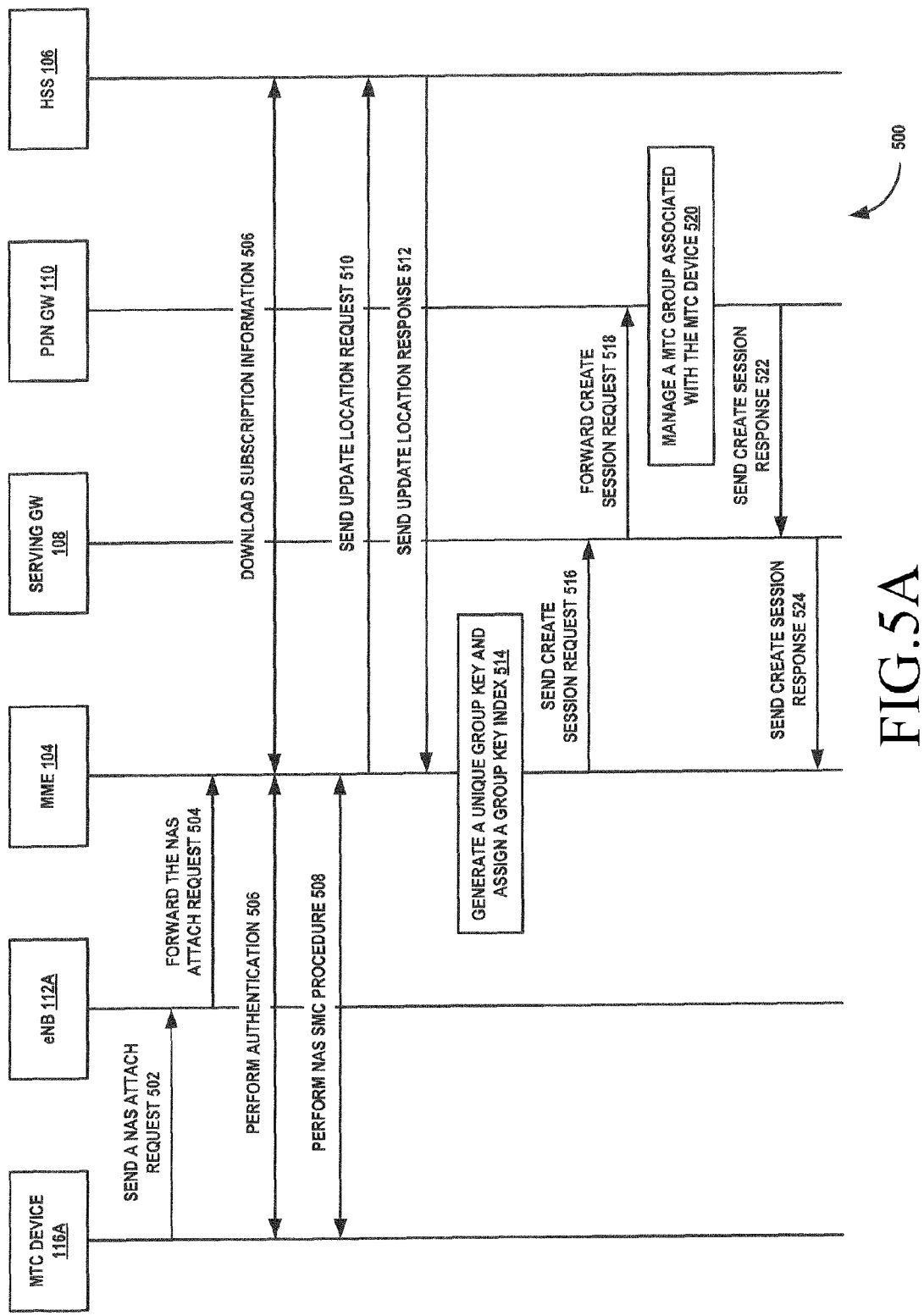
FIGS. 5A and 5B are a flow diagram illustrating distribution of a unique group key to MTC devices in an MTC group using a Protocol Configuration Options (PCO), according to an exemplary embodiment of the present invention.
Figure 5B:
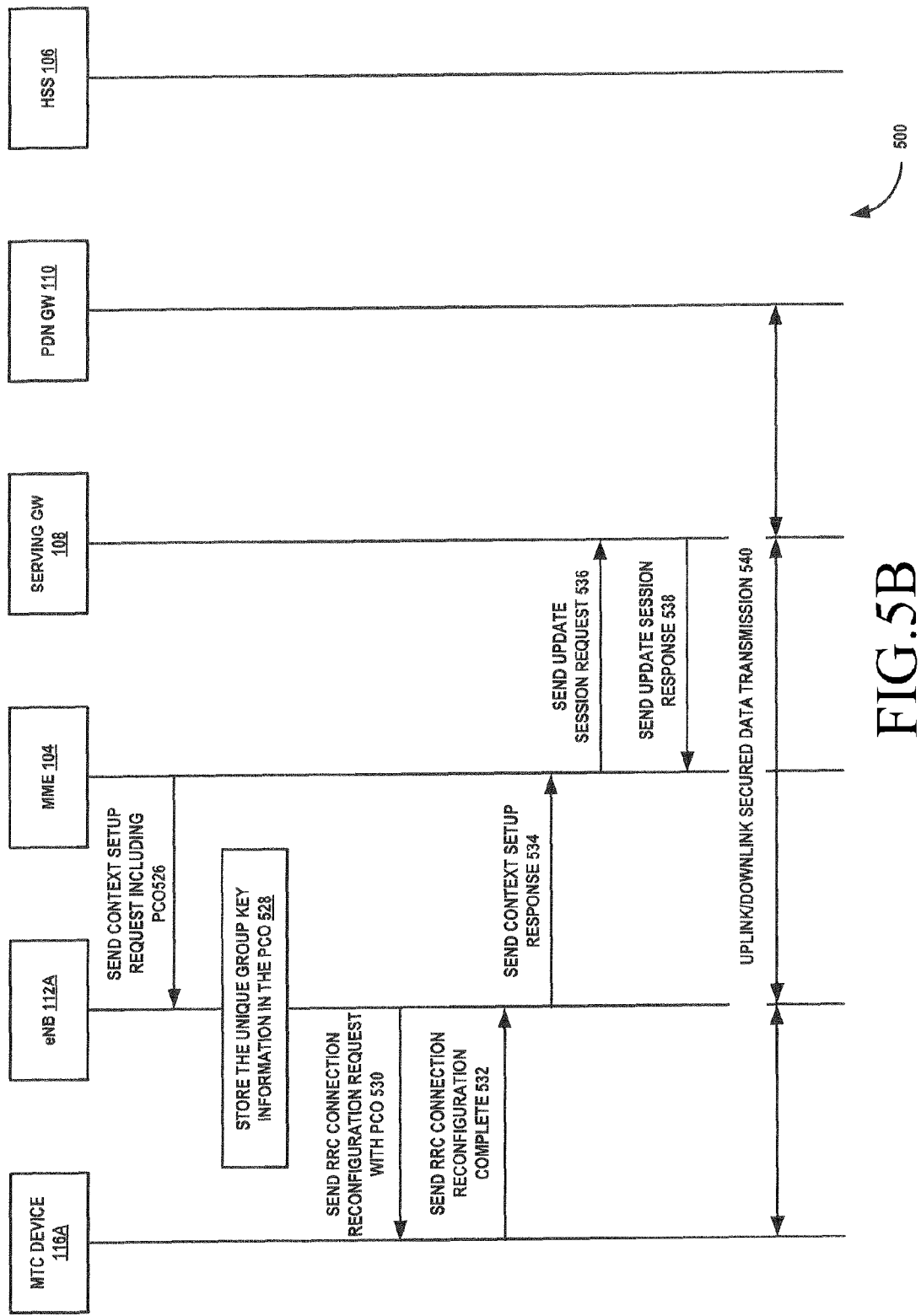

FIGS. 5A and 5B are a flow diagram illustrating distribution of a unique group key to MTC devices in an MTC group using a PCO, according to an exemplary embodiment of the present invention.

Referring to FIGS. 5A and 5B, a flow diagram 500 includes operation 502 in which the MTC device 116A sends a NAS attach request message to an eNB 112A. The NAS attach request message may be sent at the end of an RRC connection setting procedure. At operation 504, the eNB 112A forwards the NAS attach request message to the MME 104. At operation 506, the MME 104 performs a network access authentication procedure with the MTC device 116A by sending an RRC connection reconfiguration request to the MTC device 116A. During the authentication procedure of operation 506, the MME 104 downloads subscription information and may request authentication vectors for an Authentication and Key Agreement (AKA) procedure from the HSS 106. The HSS 106 may send one or more authentication vectors to the MME 104.

At operation 508, the MME 104 performs a NAS SMC procedure with the MTC device 116A in order to activate integrity protection and NAS ciphering. At operation 510, the MME 104 sends an update location request to the HSS 106. At operation 512, the HSS 106 sends an update location response including subscription information associated with the MTC device 116A to the MME 104. According to an exemplary embodiment, the HSS 106 indicates a group ID to which the MTC device 116 belongs to.

At operation 514, the MME 104 generates a unique Gkey per group and assigns a Gkey index (Gki) or retrieves the unique Gkey per group and assigns the Gki if it was already generated and stored previously for the MTC group 114A. Also, at operation 514, the MME 104 stores the newly generated group information for NAS level protection of group messages for the MTC group 114A. At operation 516, the MME 104 sends a create session request to the serving gateway 108 for creating a default bearer. The create session request may include the IMSI, the E-RAB setup list, which may also be referred to as the E-RAB ID, the Group ID, the Gkey, the Gki, supported algorithms for group message protection or MTC device capabilities for group communication, and the Gkey for group message protection at the PDN gateway 110. At operation 518, the serving gateway 108 forwards the create session request to the PDN gateway 110. The forwarded create session request may include the IMSI, the E-RAB ID, the Group ID, the S5 downlink information and the other similar information. The S5 downlink information may include the IP address of the serving gateway 108 and the GTP-U TEID. Upon receiving the create session request in operation 518, the PDN gateway 110 determines whether a common S5 uplink bearer for the MTC group 114A is existing or not. If there is no common S5 uplink bearer for the MTC group 114A, then the PDN gateway 110 creates the common S5 uplink bearer.

At operation 520, the PDN gateway 110 manages the MTC group 114A by assigning a particular group IP address for the MTC group 114A. Also, the PDN gateway 110 may protect the content received from the MTC subscriber at the IP layer or above the IP layer. The PDN gateway 110 also selects algorithms from among the selected algorithms. At operation 522, the PDN gateway 110 sends a create session response to the serving gateway 108 in response to the create session request. The create session response may include the E-RAB ID, the common S5 uplink information, and the unique Gkey information in a PCO. For a group based MTC feature, the PCO contains a IP address, which may be for a multi-cast or a unicast, a group identifier, the selected algorithms for group based protection, the Gkey, and the Gki. Upon receiving the create session response, the serving gateway 108 determines whether a common S1 uplink bearer for the MTC group 114A exists. If there is no common S1 uplink bearer for the MTC group 114A, then the serving gateway 108 creates the common S1 uplink bearer.

The serving gateway 108 then forwards the create session response including the E-RAB ID, the common S1 uplink bearer, the PCO, and the other similar information, to the MME 104, at operation 524. The common S1 uplink bearer includes IP address of the serving gateway 108, and includes the GTP-U TEID. At operation 526, as shown in FIG. 5B, the MME 104 sends a context setup request message including the NAS attach accept, the E-RAB setup list, the unique Gkey information, the S1 uplink information, and the other similar information to the eNB 112A. At operation 528, the eNB 112A stores the unique Gkey information for group message protection. The unique Gkey for group message protection may be encrypted by the eNB 112A using an Access Stratum (AS) security context, or in other words, AS ciphering.

At operation 530, the eNB 112A may perform an RRC connection reconfiguration procedure with the MTC device 116A by sending an RRC connection reconfiguration request to the MTC device 116A. At operation 532, the MTC device 116A sends an RRC connection reconfiguration complete message to the eNB 112A. According to an exemplary embodiment, the RRC connection reconfiguration complete message may include the PCO. Upon completion of the RRC connection reconfiguration procedure, the eNB 112A sends a context setup response including the E-RAB setup list, which may include the E-RAB ID, the S1 downlink information and other similar information, to the MME 104, at operation 534. The S1 downlink information may include the IP address of the eNB 112A and the GTP-U TEID.

At operation 536, the MME 104 sends an update session request, which may include the IMSI, the E-RAB ID, the S1 downlink information, and the other similar information, to the serving gateway 108. Accordingly, at operation 538, the serving gateway 108 sends an update session response to the MME 104 in response to the update session request. At operation 540, communication of group messages between the MTC server 120 and the MTC device 116A is performed in a secured manner using the unique group key information.

While the invention has been shown and described with reference to certain exemplary embodiments thereof, it will be understood by those skilled in the art that various changes in form and details may be made therein without departing from the spirit and scope of the invention as defined by the appended claims and their equivalents. Furthermore, the various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method of securing group communication in a machine-to-machine (M2M) communication environment, wherein the M2M communication environment includes a plurality of machine type communication (MTC) groups, and wherein each of the plurality of MTC groups includes a plurality of MTC devices, the method comprising:
    receiving, by a first network entity securing group communication of MTC devices, subscription information of the MTC devices associated with an MTC group from a second network entity managing the subscription information, the subscription information including a group identifier associated with the MTC group to which the MTC devices belong;
    generating, by the first network entity, a unique group key for securing communication with the MTC devices associated with the MTC group in the M2M communication environment, based on the subscription information of the MTC devices; and
    securely providing, by the first network entity, information on the unique group key to the MTC devices associated with the MTC group,
    wherein the MTC devices securely receive at least one broadcast group message using the information on the unique group key.

2. The method of claim 1, wherein the information on the unique group key comprises a unique group key for each of the plurality of MTC groups, and at least one of an index value associated with the unique group key, a validity period associated with the unique group key, and a selected security algorithm for group message protection.

3. The method of claim 1, further comprising:
    receiving, by the first network entity, a non-access stratum (NAS) attach request from an MTC device; and
    retrieving, by the first network entity, at least one unique group key associated with the MTC device.

4. The method of claim 1, wherein the at least one broadcast group message encrypted by the information on the unique group key is transmitted to the MTC devices associated with the MTC group.

5. The method of claim 4,
    wherein the at least one encrypted broadcast group message is transmitted from an operator network associated with the MTC group, and wherein each of the MTC devices decrypt the at least one encrypted broadcast message using the information on the unique group key.

6. The method of claim 1, wherein the securely providing the information on the unique group key to the MTC devices associated with the MTC group comprises:

securely distributing, by the first network entity, the information on the unique group key to the MTC devices associated with the MTC group using a non-access stratum (NAS) security mode command procedure.

7. The method of claim 6, wherein, when performing the securely distributing of the information on the unique group key to the MTC devices associated with the MTC group, the information on the unique group key is secured using a NAS security context.

8. The method of claim 1, wherein the securely providing of the information on the unique group key to the MTC devices associated with the MTC group comprises:

securely distributing, by the first network entity, the information on the unique group key to the MTC devices associated with the MTC group using protocol configuration options (PCO).

9. The method of claim 1, wherein the securely providing the information on the unique group key to the MTC devices associated with the MTC group comprises:

securely distributing, by the first network entity, the information on the unique group key to the MTC devices associated with the MTC group using a MTC group security mode command procedure.

10. The method of claim 9, wherein, when securely distributing of the information on the unique group key to the MTC devices associated with the MTC group, the information on the unique group key is secured using a NAS security context.

11. A network entity for securing group communication of machine type communication (MTC) devices in a machine-to-machine (M2M) communication system, the network entity comprising:

a communication interface configured to communicate with another network entity; and at least one processor configured to:

receive subscription information of the MTC devices associated with an MTC group from other network entity managing the subscription information, the subscription information including a group identifier associated with the MTC group to which the MTC devices belong, generate a unique group key for securing communication with the MTC devices associated with an MTC group, based on the subscription information of the MTC devices, and securely provide information on the unique group key to the at least one of the plurality of MTC devices associated with the at least one MTC group, wherein the MTC devices securely receive at least one broadcast group message using the information on the unique group key.

12. The network entity of claim 11, wherein the information on the unique group key comprises a unique group key per group, and at least one of an index value associated with the unique group key, a validity period for the unique group key, and a selected security algorithm for group message protection.

13. The network entity of claim 11, wherein the at least one processor is further configured to securely distribute the unique group key information to the plurality of MTC devices associated with the MTC group using a non-access stratum (NAS) security mode command procedure.

14. The network entity of claim 13, wherein, when the at least one processor securely distributes the information on the unique group key to the MTC devices associated with the MTC group, the information on the unique group key is secured using a NAS security context.

15. The network entity of claim 11, wherein the at least one processor is further configured to securely distribute the information on the unique group key to the MTC devices associated with the MTC group using an MTC group security mode command procedure.

16. The network entity of claim 15, wherein, when the at least one processor securely distributes the information on the unique group key to the MTC devices associated with the MTC group, the information on the unique group key is secured using a non-access stratum (NAS) security context.

17. The network entity of claim 11, wherein the at least one processor is further configured to securely distribute the information on the unique group key to the MTC devices associated with the MTC group using protocol configuration options (PCO).

* * * * *